United States Patent [19]

Kida

[11] Patent Number: 5,219,719
[45] Date of Patent: Jun. 15, 1993

[54] SILVER HALIDE COLOR PHOTOGRAPHIC LIGHT-SENSITIVE MATERIAL WITH COLORED MAGENTA COUPLER

[75] Inventor: Shuji Kida, Hino, Japan
[73] Assignee: Konica Corporation, Tokyo, Japan
[21] Appl. No.: 694,569
[22] Filed: May 2, 1991

[30] Foreign Application Priority Data

May 11, 1990 [JP] Japan .................................. 2-122400

[51] Int. Cl.$^5$ .......................... G03C 7/38; G03C 7/18
[52] U.S. Cl. ..................... 430/549; 430/359; 430/555
[58] Field of Search ................ 430/359, 549, 555, 554

[56] References Cited

U.S. PATENT DOCUMENTS

| | | | |
|---|---|---|---|
| 2,983,608 | 5/1961 | Beavers | 430/555 |
| 3,928,044 | 12/1975 | Arai et al. | 430/555 |
| 4,163,670 | 8/1979 | Shiba et al. | 430/555 |
| 4,199,361 | 4/1980 | Furutachi | 430/554 |

FOREIGN PATENT DOCUMENTS 2336711 7/1977 France .
2371000 6/1978 France .

*Primary Examiner*—Richard L. Schilling
*Attorney, Agent, or Firm*—Jordan B. Bierman

[57] ABSTRACT

A silver halide photographic light-sensitive material is disclosed. The light-sensitive material comprises a support having thereon a hydrophilic colloid containing a compound represented by the following Formula I as a colored coupler,

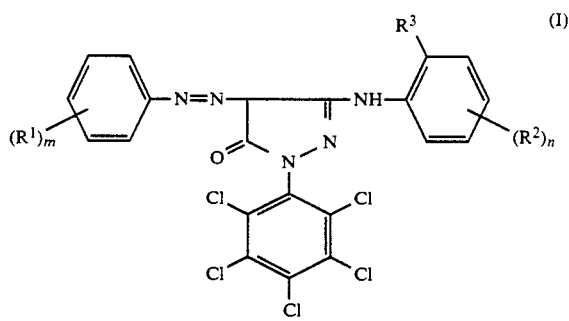

wherein $R^1$ is a substituent; $R^3$ is a halogen atom or an alkoxy group; $R^2$ is an acylamino group, a sulfonamido group, an imido group, a carbamoyl group, a sulfamoyl group, an alkoxycarbonyl group or an alkoxycarboxyamido group; m is an integer of 0 to 5 and n is an integer of 0 to 4. The light-sensitive material has a good color reproducibility caused by the masking effect of the colored coupler with less lossing in the speed.

12 Claims, No Drawings

SILVER HALIDE COLOR PHOTOGRAPHIC LIGHT-SENSITIVE MATERIAL WITH COLORED MAGENTA COUPLER

FIELD OF THE INVENTION

The present invention relates to a silver halide color photographic light-sensitive material, more specifically to a silver halide color photographic light-sensitive material containing a useful colored magenta coupler.

BACKGROUND OF THE INVENTION

With respect to color photographic light-sensitive materials, the yellow, magenta and cyan dyes formed by couplers do not always possess an ideal light-absorption characteristic. For example, the magenta dye image usually absorbs some blue light in addition to the desired absorption of green light, which hampers exact color reproduction. To eliminate this hamper to color reproduction, a coupler is used which has yellow- or magenta-color before the coupling with the oxidation product of an aromatic primary amine color developing agent. The former is the so-called colored magenta coupler, and the latter is the so-called colored cyan coupler.

For the auto-masking method using such a colored coupler, detailed description appears in, for example, J. Phot. Soc. Am., 13, 94 (1947), J. Opt. Soc. Am., 40, 166 (1950) and J. Am. Chem. Soc., 72, 1533 (1950).

Colored magenta couplers showing main absorption in the blue light band are described in U.S. Pat. Nos. 2,428,054 and 2,449,966 for 1-phenyl-3-acylamino-4-phenylazo-5-pyrazolone, U.S. Pat. No. 2,763,552 for a colored magenta coupler having a 4-methoxyallylazo group, U.S. Pat. No. 2,983,608 for 1-phenyl-3-anilino-4-phenylazo-5-pyrazolone, U.S. Pat. Nos. 3,519,429 and 3,615,506 for those having a naphthylazo group, U.S. Pat. No. 1,044,778 for a colored magenta coupler having a water-soluble group, U.S. Pat. No. 3,476,564 and Japanese Patent Publication Open to Public Inspection (hereinafter referred to as Japanese Patent O.P.I. Publication) Nos. 123625/1974, 131448/1974 and 52532/1979 for those having a hydroxyphenylazo group, Japanese Patent O.P.I. Publication No. 42121/1977 for a colored magenta coupler having an acylaminophenylazo group, Japanese Patent O.P.I. Publication No. 102723/1977 for a colored magenta coupler having a substituted alkoxyphenylazo group and Japanese Patent O.P.I. Publication No. 63016/1978 for a colored magenta coupler having a thiophenylazo group.

However, none of these colored magenta couplers are satisfactory because some of them must be added in large amounts due to their low molar absorption coefficient, some of them are difficult to prepare to obtain a main absorption in the desired band, some of them have an insufficient masking effect due to their low developing activity, some of them are apt to cause fogging though their developing activity is high, some of them are low in stability to light, heat or humidity, some of them forms a magenta dye of short wavelength by reaction with the color developing agent. Therefore, it is the common practice to use them in combination of several kinds to obtain the desired performance. In recent years, there have been increasing demands for improved performance of colored magenta couplers with the use of high speed fine grain silver halide emulsions and magenta couplers with high color formation efficiency.

SUMMARY OF THE INVENTION

It is an object of the present invention to provide a silver halide color photographic light-sensitive material containing a colored coupler which has high developing activity and thus shows a high masking effect even in small amounts, which does not cause significant fogging even when used in combination with a high speed silver halide emulsion or coupler with high color formation efficiency, which is stable to light, heat or humidity and which forms a magenta dye having a light-absorption at a long wavelength region by reaction with a color developing agent.

The object of the present invention described above can be accomplished by the silver halide color photographic light-sensitive material having a hydrophilic colloidal layer which contains a compound represented by the Formula I given below and which is formed on a support

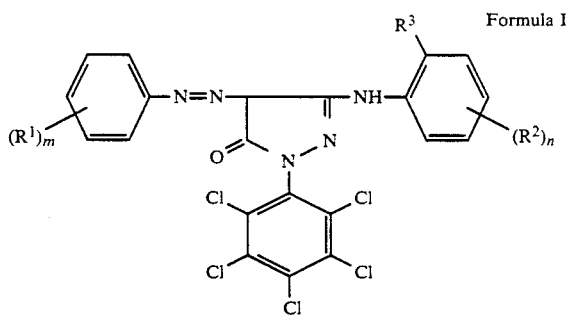

wherein $R^1$ represents a substituent; $R^3$ represents a halogen atom or alkoxy group; $R^2$ represents an acylamino group, sulfonamido group, imido group, carbamoyl group, sulfamoyl group, alkoxycarbonyl group or alkoxycarboxyamido group. m represents an integer of 0 to 5; n represent an integer of 0 to 4.

The present invention is hereinafter described in more detail.

Examples of the substituent represented by $R^1$ include an alkyl group, alkoxy group, aryl group, acylamino group, sulfonamido group, hydroxyl group, halogen atom, alkoxycarbonyl group, acyl group, carbamoyl group, sulfamoyl group and carboxyl group. These groups may have an additional substituent.

$R^1$ is preferably an alkyl group, alkoxy group, hydroxyl group or acylamino group, with most preference given to an alkoxy group.

Examples of the halogen atom represented by $R^3$ include a chlorine atom, bromine atom and fluorine atom. Examples of the alkoxy group include a methoxy group and dodecyloxy group. $R^3$ is preferably a chlorine atom.

Examples of the acylamino group represented by $R^2$ include a 2,4-di-t-pentylphenoxyacetamido group. Examples of the sulfonamido group include a 4-dodecyloxyphenylsulfonamido group. Examples of the imido group include an octadecenylsuccinimido group. Examples of the carbamoyl group include a 4-(2,4-di-t-pentylphenoxy)butylaminocarbonyl group. Examples of the sulfamoyl group include a tetradecanesulfamoyl group. Examples of the alkoxycarbonyl group include a tetradecaneoxycarbonyl group. Examples of the alkoxycarboxyamide group include a dodecyloxycarboxyamide group.

$R^2$ is preferably an acylamino group substituted at the p-position with respect to $R^3$. m is preferably 1 or 2, and n is preferably 1.

The compound represented by the Formula I above, hereinafter referred as colored coupler of the invention, is exemplified below, but the invention is not to be construed as limited by these examples.

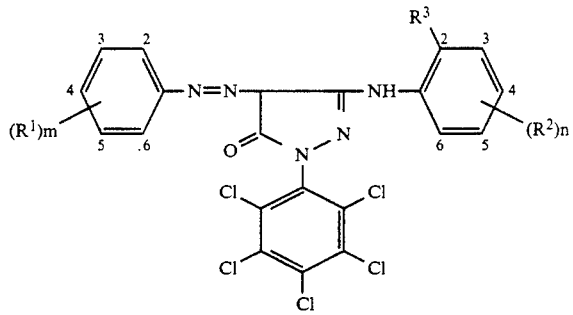

| Compound | $(R^1)m$ | $(R^2)n$ | $R^3$ |
|---|---|---|---|
| CM-1 | 3-OCH₃, 4-OCH₃ | 5-NHCOCH₂O—(3,5-di-$C_5H_{11}(t)$-phenyl) | —Cl |
| CM-2 | 3-OCH₃, 4-OCH₃ | 5-NHCOC₁₃H₂₇ | —Cl |
| CM-3 | 3-OCH₃, 4-OCH₃ | 4-SO₂C₁₆H₃₃ | —Cl |
| CM-4 | 3-OCH₃, 4-OCH₃ | 5-N(succinimide with C₁₈H₃₅) | —Cl |
| CM-5 | 3-OCH₃, 4-OCH₃ | 5-NHSO₂C₁₆H₃₃ | —Cl |
| CM-6 | 3-OCH₃, 4-OCH₃ | 5-CONHC₁₄H₂₉ | —Cl |
| CM-7 | 3-OC₂H₅, 4-OC₂H₅ | 5-NHCOC₁₃H₂₇ | —Cl |
| CM-8 | 3-OC₂H₅, 4-OC₂H₅ | 5-NHCOCH(C₁₂H₂₅)—(3-$C_4H_9(t)$-4-OH-phenyl) | —Cl |
| CM-9 | 3-OC₂H₅, 4-OC₂H₅ | 5-NHCOCH(C₂H₅)—(3,5-di-$C_5H_{11}(t)$-phenyl) | —Cl |
| CM-10 | 3-OC₂H₅, 4-OC₂H₅ | 5-N(succinimide with C₁₈H₃₅) | —Cl |
| CM-11 | 3-OC₂H₅, 4-OC₂H₅ | 5-NHCOCH(C₂H₅)—(4-C₁₅H₃₁-phenyl) | —Cl |

-continued

[Structure: pyrazolone dye with pentachlorophenyl N-substituent, arylazo group bearing (R¹)m, and arylamino group bearing (R²)n and R³]

| Compound | (R¹)m | (R²)n | R³ |
|---|---|---|---|
| CM-12 | 4-OCH₃ | 5-NHCOOCH(CH₃)CH₂O–(2-cyclopentyl-4-C₄H₉(t)-phenyl) with H on cyclopentyl | —Cl |
| CM-13 | 4-OCH₃ | 5-NHCOCH(C₂H₅)O–(2-C₅H₁₁(t), 4-C₅H₁₁(t)-phenyl) | —Cl |
| CM-14 | 4-OCH₃ | — (n = 0) | —OC₁₂H₂₅ |
| CM-15 | 3-CH₃, 4-OH | 5-NHCO(CH₂)₃O–(2-C₅H₁₁(t), 4-C₅H₁₁(t)-phenyl) | —Cl |
| CM-16 | 3-CH₃, 4-OH | 5-NHCOCH(CH₃)O–(3-OC₁₂H₂₅-phenyl) | —Cl |
| CM-17 | 4-OH | 5-NHCOOC₁₆H₃₃ | —Cl |
| CM-18 | 4-OH | 4-OC₈H₁₇, 5-OC₈H₁₇ | —Cl |
| CM-19 | 4-OCH₂CH₂O–(phenyl) | 5-NHCOCH(C₁₀H₂₁)O–(phenyl)–SO₂–(4-OH-phenyl) | —OCH₃ |
| CM-20 | 4-NHCOC₄H₉(t) | 5-NHCOC₁₃H₂₇ | —Cl |
| CM-21 | 4-NHCOC₄H₉(t) | 5-NHCOCH(C₂H₅)O–(3-C₁₅H₃₁-phenyl) | —Cl |
| CM-22 | 3-C₃H₇(i), 4-C₃H₇(i) | 5-COOC₁₂H₂₅ | —Cl |
| CM-23 | 3-C₃H₇(i), 4-C₃H₇(i) | 4-SO₂N(C₈H₁₇)₂ | —F |
| CM-24 | 3-OCH₃, 4-OCH₃ | 5-NHCOCH(C₂H₅)O–(2-C₅H₁₁(t), 4-C₅H₁₁(t)-phenyl) | Cl |

-continued

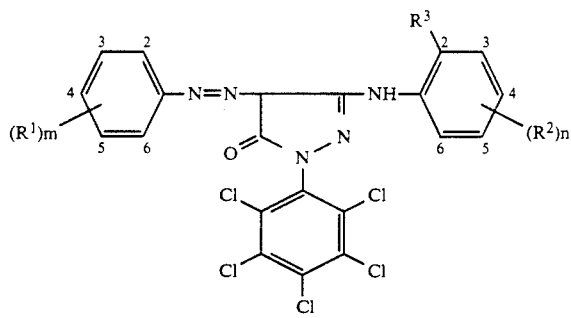

| Compound | (R¹)m | (R²)n | R³ |
|---|---|---|---|
| CM-25 | 3-OC$_2$H$_5$, 4-OC$_2$H$_5$ | 5-NHCOCHO—⟨C$_5$H$_{11}$(t), C$_5$H$_{11}$(t)⟩ with C$_2$H$_5$ | Cl |
| CM-26 | 4-OC$_2$H$_5$ | 5-NHCOCHO—⟨C$_5$H$_{11}$(t), C$_5$H$_{11}$(t)⟩ with C$_2$H$_5$ | Cl |
| CM-27 | 4-OC$_3$H$_7$ | 5-NHCOCHO—⟨C$_5$H$_{11}$(t), C$_5$H$_{11}$(t)⟩ with C$_2$H$_5$ | Cl |
| CM-28 | 4-OC$_4$H$_9$ | 5-NHCOCHO—⟨C$_5$H$_{11}$(t), C$_5$H$_{11}$(t)⟩ with C$_2$H$_5$ | Cl |
| CM-29 | 4-OCH$_3$ | 5-NHCO(CH$_2$)$_3$O—⟨C$_5$H$_{11}$(t), C$_5$H$_{11}$(t)⟩ | Cl |

The colored coupler of the present invention represented by the Formula I can normally be synthesized by the conventional so-called diazo coupling reaction. For example, it can be synthesized by the method described in Japanese Patent Examined Publication No. 6540/1981. Specifically, an aniline derivative is diazotized using 1 to 5 mol equivalents of concentrate hydrochloric acid and 1 to 1.2 mol equivalents of sodium nitrite in water or hydrated alcohol or hydrated acetone at 0° to −10° C. This solution is added to a separately prepared pyridine solution of a magenta coupler in the same molar amount as of the aniline derivative at −5° to −10° C. for diazo coupling to yield the desired colored coupler.

Examples of synthesis of the colored coupler of the present invention represented by the Formula I are described below.

EXAMPLE OF SYNTHESIS 1 (SYNTHESIS OF CM-7)

In 3 ml of concentrate hydrochloric acid and 18 ml of water, 1.4 g of 3,4-diethoxyaniline was dissolved by heating. After cooling to −3° C., this solution was subjected to diazotization by the addition of 5.3 ml of a 10% aqueous solution of sodium nitrite and stirred at −3° C. for 20 minutes. Then 0.1 g of urea was added to decompose the excess nitrite. Separately, 5.2 g of 1-(2,3,4,5,6-pentachlorophenyl)-3-(2-chloro-5-tetradecanamidoanilino)-5-pyr azolone was dissolved in 100 ml of pyridine, and this solution was cooled to −5° to −10° C. and stirred. To this solution the diazonium salt solution prepared above was gradually added.

Three hours later, the reaction mixture was added to 400 ml of ice water containing 100 ml of concentrate hydrochloric acid, The resulting crystal was collected by filtration, washed with water and dried, after which it was recrystallized from a mixed solution of ethyl acetate and acetonitrile to yield 5.5 g of CM-7.

EXAMPLE OF SYNTHESIS 2 (SYNTHESIS OF CM-13)

In 3 ml of concentrate hydrochloric acid and 20 ml of water, 1.0 g of 4-methoxyaniline was dissolved by heating. After cooling to $-3°$ C., this solution was subjected to diazotization by the addition of 5.3 ml of a 10% aqueous solution of sodium nitrite and stirred at $-3°$ C. for 20 minutes. Then 0.1 g of urea was added to decompose the excess sodium nitrite.

Separately, 5.6 g of 1-(2,3,4,5,6-pentachlorophenyl)-3-2-chloro-5-[α-(2,4-di-t-amylphenoxy)-butanamido]anilino-5-pyrazolone was dissolved in 100 ml of pyridine, and this solution was cooled to $-5°$ to $-10°$ C. and stirred. To this solution the diazonium salt solution prepared above was gradually added.

Three hours later, the reaction mixture was added to 400 ml of ice water containing 100 ml of concentrate hydrochloric acid, The resulting crystal was collected by filtration, washed with water and dried, after which it was recrystallized from a mixed solution of acetonitrile and ethyl acetate to yield 5.1 g of CM-13.

These compounds were structurally identified by NMR spectrometry and mass spectrometry.

The colored coupler of the present invention represented by the Formula I above can be used in combination of one or more kinds, and on the basis of the principle of auto-masking it is preferably used in combination with one or more kinds of substantially colorless magenta coupler. The magenta coupler may be a magenta coupler normally used in color light-sensitive materials. Although there is no limitation, a magenta coupler of the pyrazolone type represented by the following Formula M-I or pyrazoloazole type represented by the following Formula M-II is preferred.

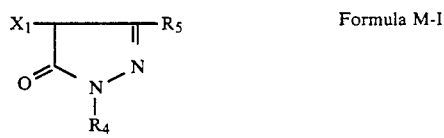

Formula M-I wherein $R_4$ represents an aryl group; $R_5$ represents an acylamino group, an arylamino group, a ureido group, a carbamoyl group or a heterocyclic group; and $X_1$ represents a hydrogen atom or a substituent capable of splitting off upon coupling reaction with the oxidation product of a color developing agent. The aryl group represented by $R_4$ is preferably a phenyl group which may have a substituent.

Examples of magenta couplers represented by Formula M-I are given below.

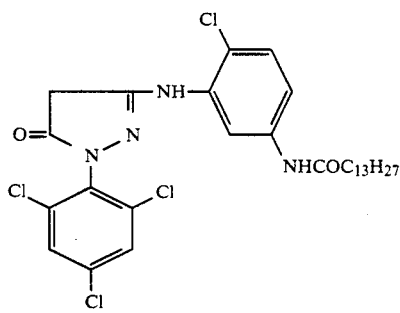

M-I-1

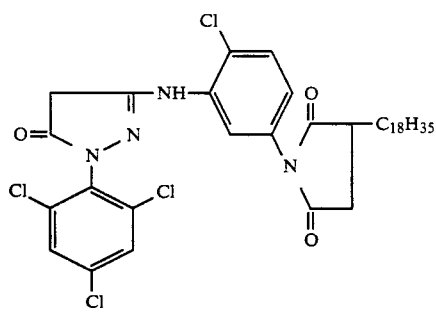

M-I-2

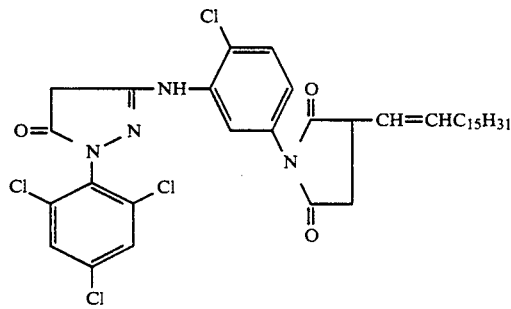

M-I-3

-continued
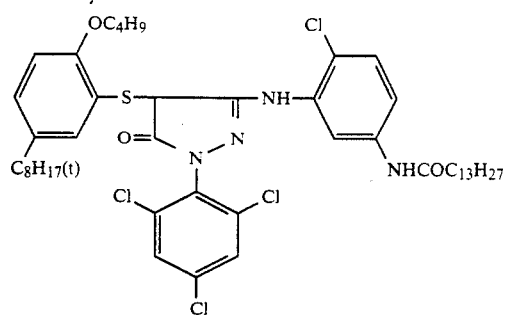
M-I-4
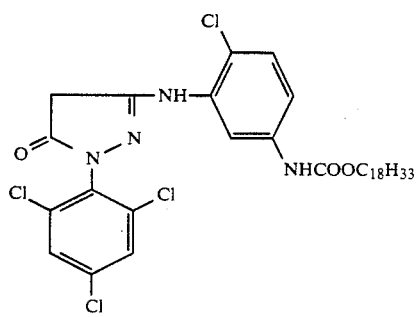
M-I-5
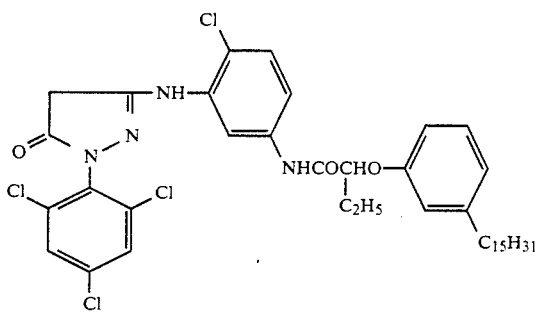
M-I-6
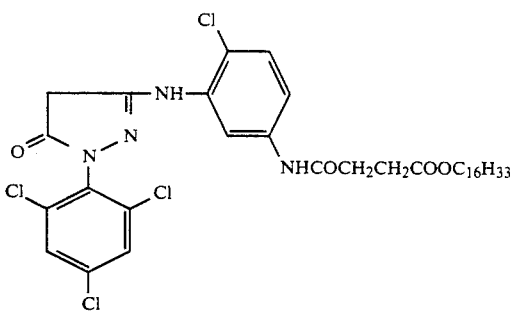
M-I-7
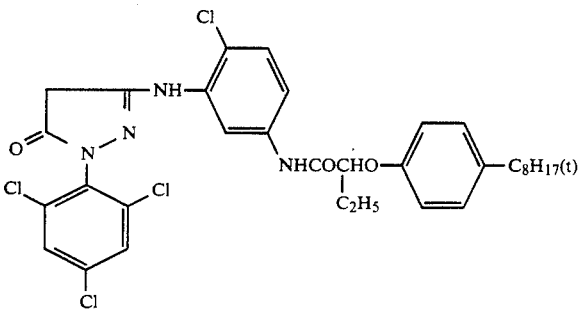
M-I-8

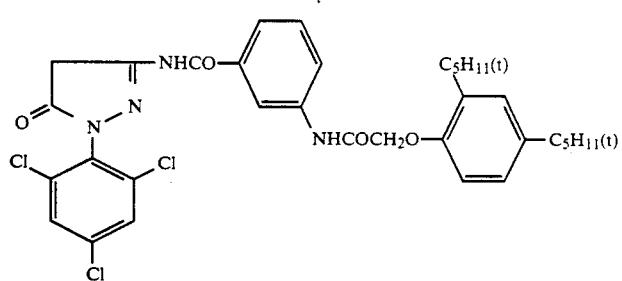
M-I-9
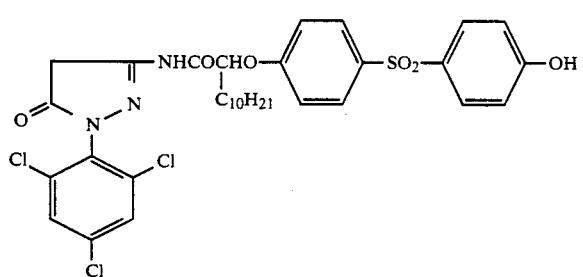
M-I-10
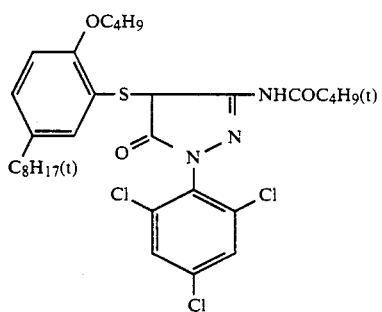
M-I-11
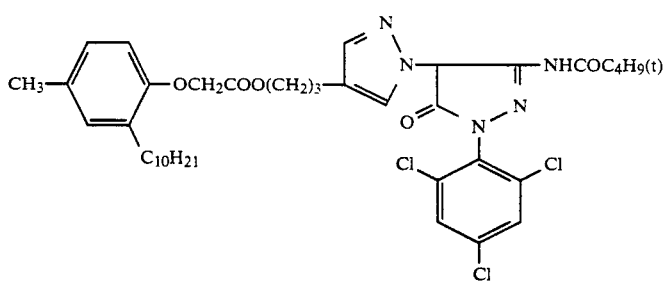
M-I-12
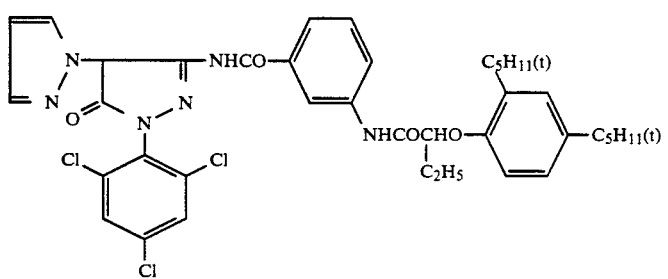
M-I-13

-continued
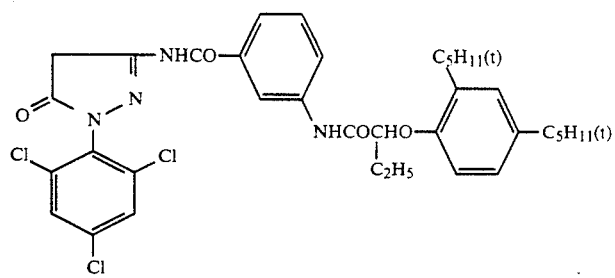
M-I-14
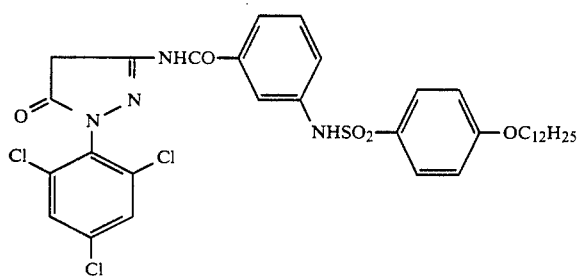
M-I-15
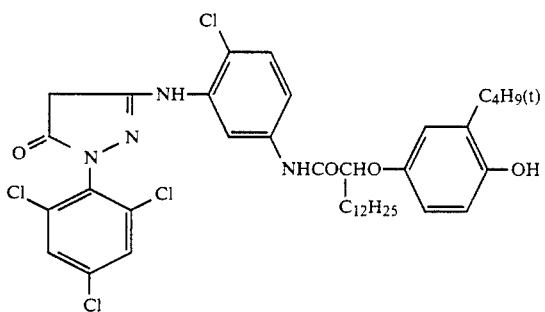
M-I-16
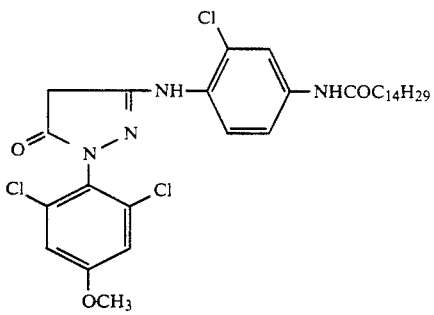
M-I-17
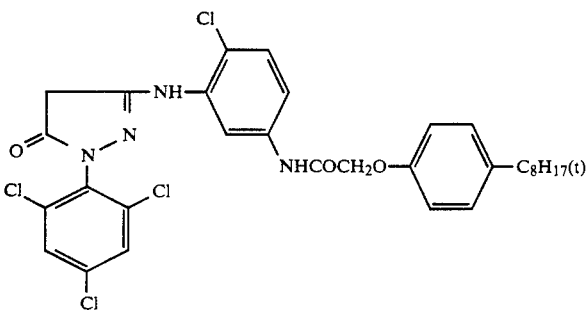
M-I-18

-continued
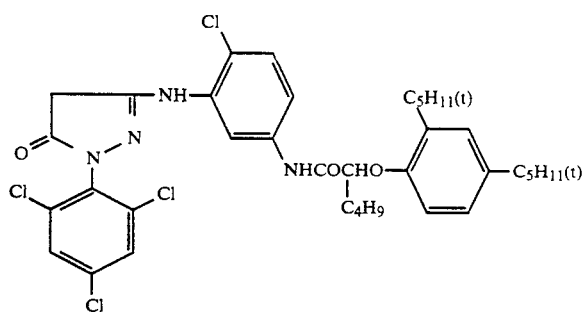
M-I-19
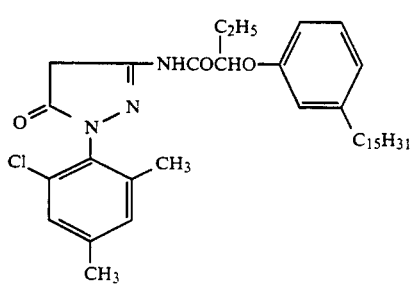
M-I-20
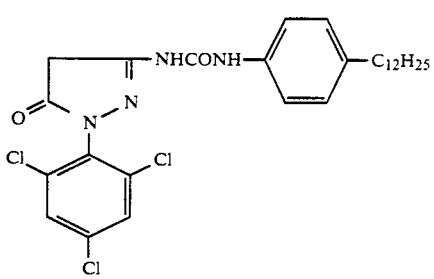
M-I-21
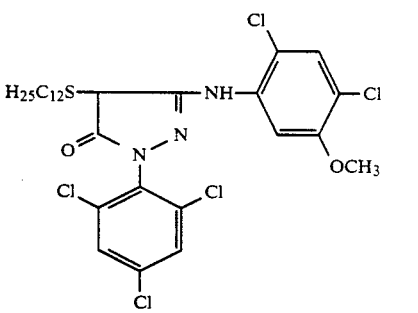
M-I-22
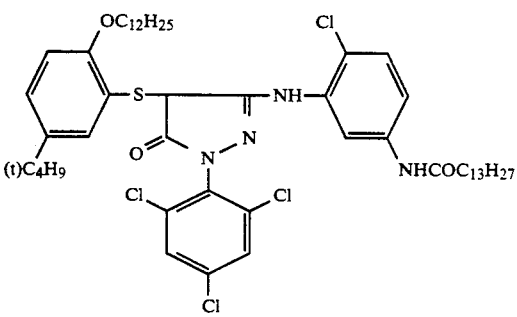
M-I-23

-continued
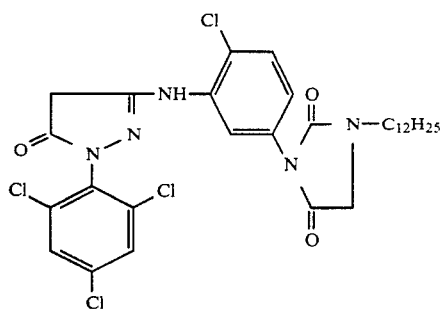
M-I-24
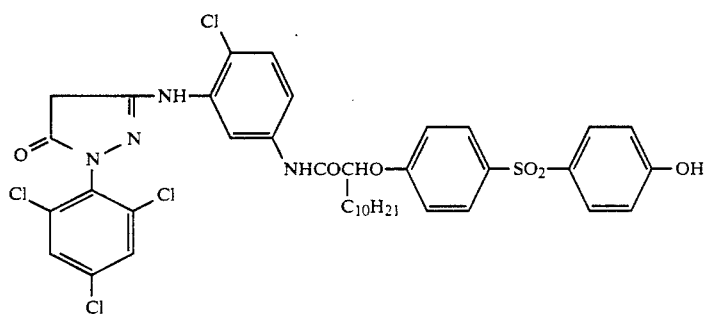
M-I-25
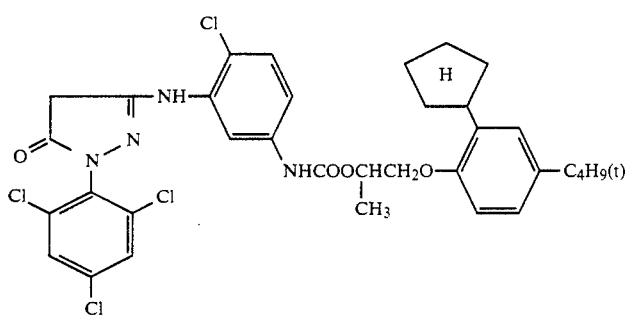
M-I-26
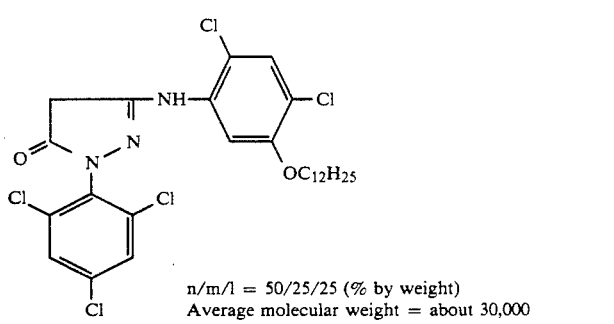
n/m/l = 50/25/25 (% by weight)
Average molecular weight = about 30,000
M-I-27
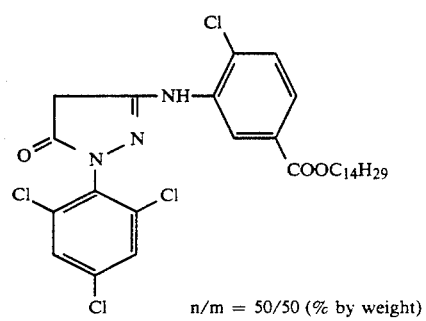
n/m = 50/50 (% by weight)
M-I-28

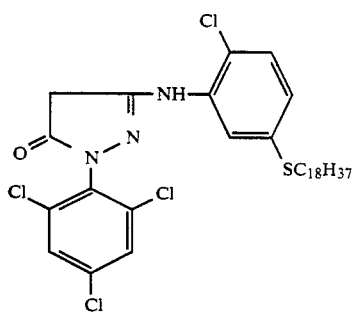
M-I-29
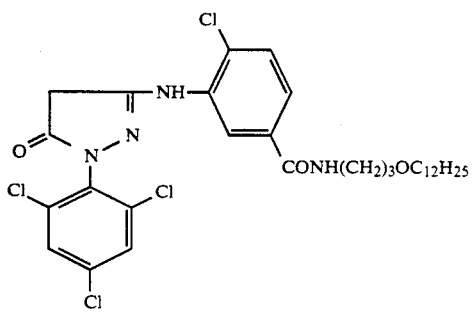
M-I-30
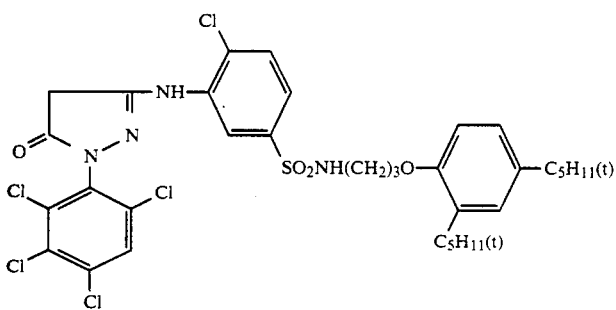
M-I-31
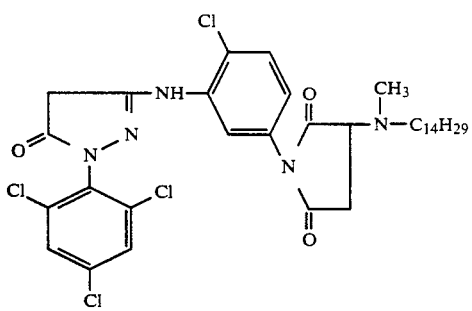
M-I-32
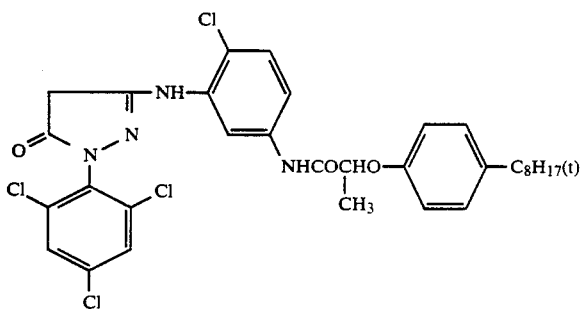
M-I-33

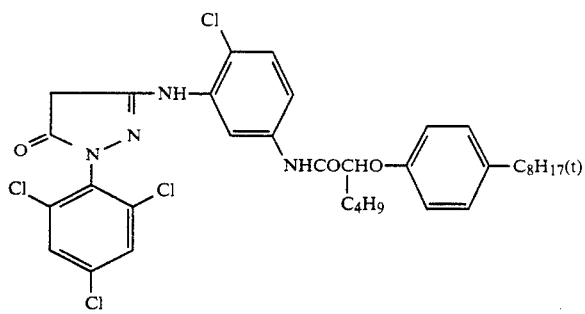
M-I-34
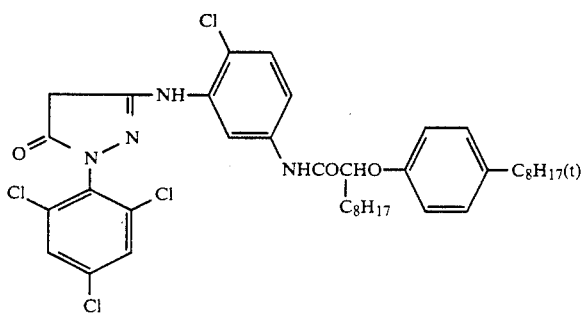
M-I-35
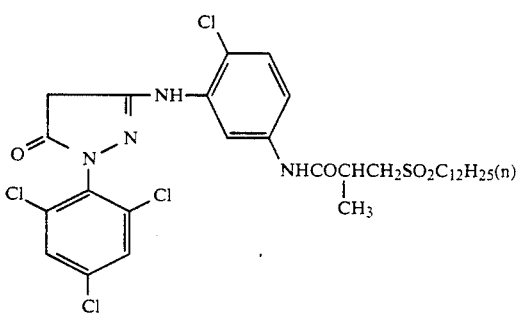
M-I-36
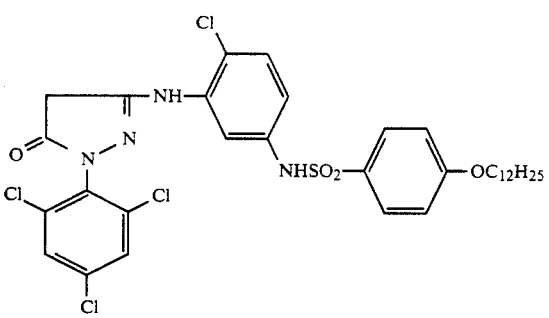
M-I-37
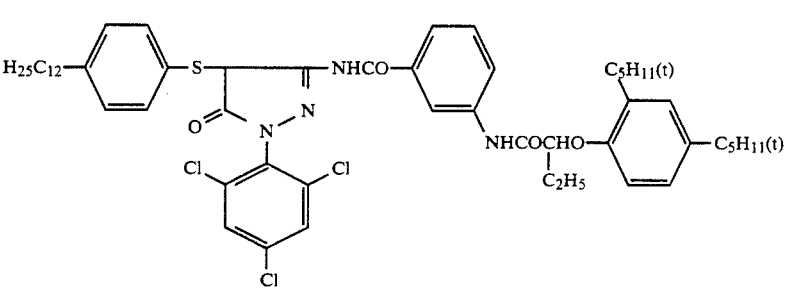
M-I-38

-continued
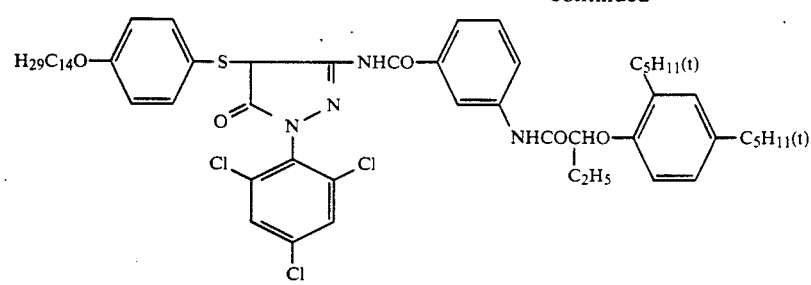
M-I-39
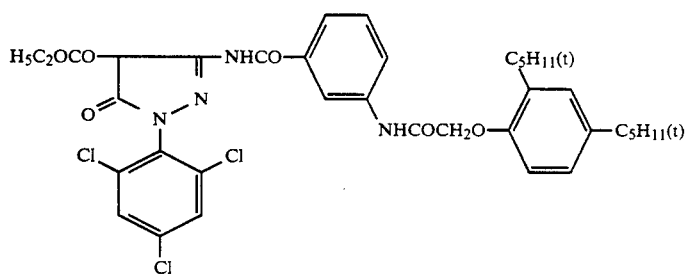
M-I-40
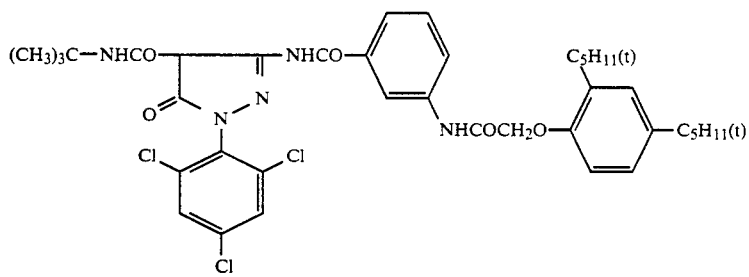
M-I-41
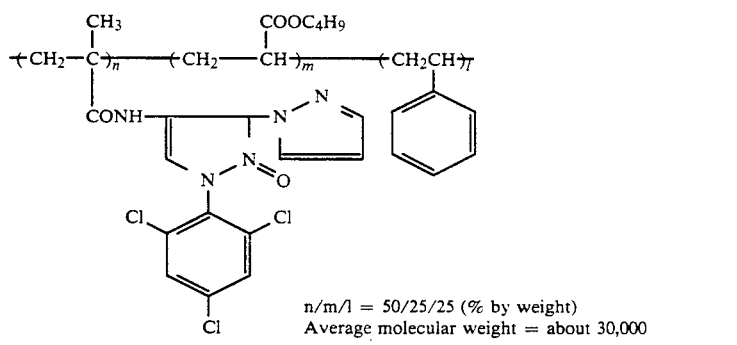
M-I-42
n/m/l = 50/25/25 (% by weight)
Average molecular weight = about 30,000
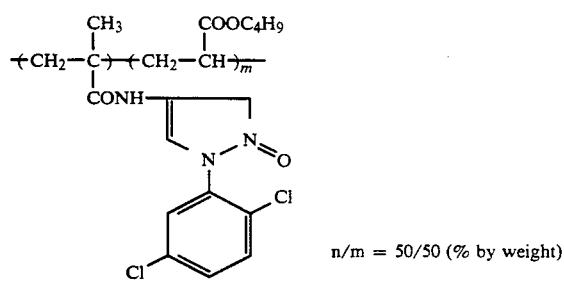
M-I-43
n/m = 50/50 (% by weight)
Formula M-II
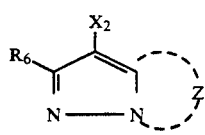
wherein Z represents a group of atoms necessary for completing a nitrogen-containing heterocyclic ring which may have a substituent; $X_2$ represents a hydrogen atom or a substituent capable of splitting off upon coupling reaction with the oxidation product of a color developing agent. Although there is no limitation, typical substituents represented by $R_6$ include an alkyl group, an aryl group, an anilino group, an acylamino group, a sulfonamido group, an alkylthio group, an arylthio group, an alkenyl group and a cyloalkyl group. Substituents represented by $R_6$ may further include a halogen atom, a cycloalkenyl group, an alkynyl group, a heterocyclic group, a sulfonyl group, a sulfinyl group, an acyl group, a carbamoyl group, a sulfamoyl group, a cyano group, an alkoxy group, an aryloxy group, a heterocycloxy group, a siloxy group, an acyloxy group, a carbamoyloxy group, an amino group, an alkylamino group, an imido group, a ureido group, a sulfamoylamino group, an alkoxycarbonylamino group, an aryloxycarbonylamino group, an alkoxycarbonyl group, an aryloxycarbonyl group, a heterocyclothio group, a spyro-compound residue and a bridged hydrocarbon compound residue.

Representative example of magenta coupler represented by Formula M-II are given below.

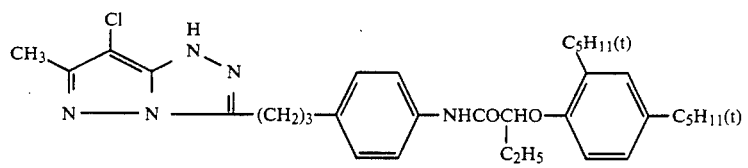

M-II-1

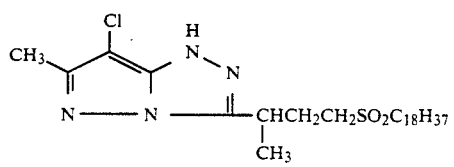

M-II-2

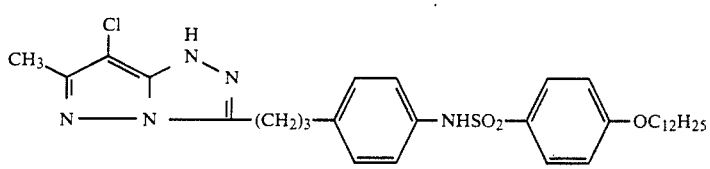

M-II-3

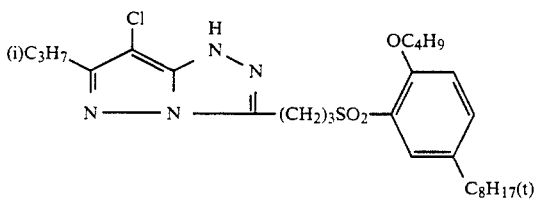

M-II-4

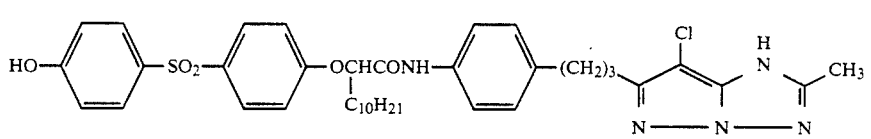

M-II-5

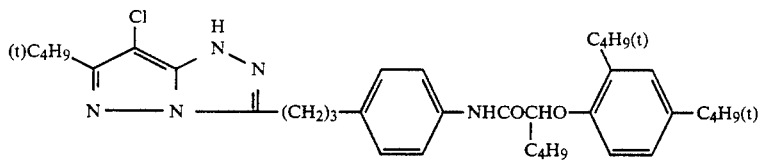

M-II-6

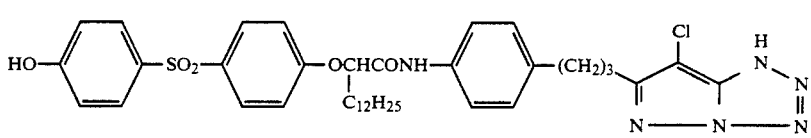

M-II-7

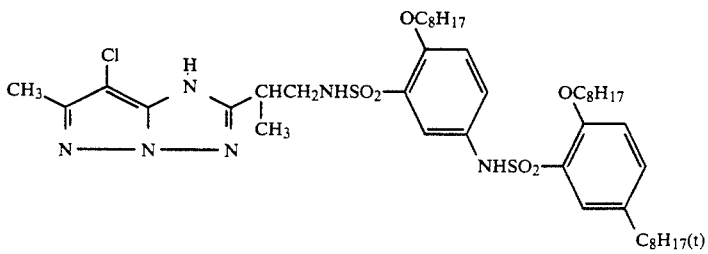

M-II-8

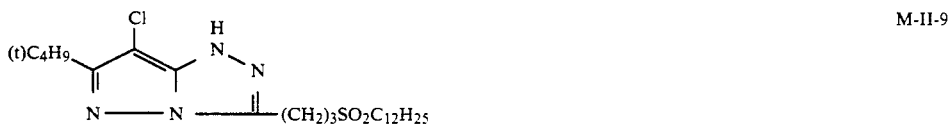
M-II-9
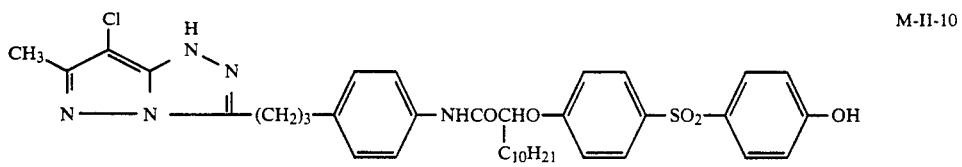
M-II-10
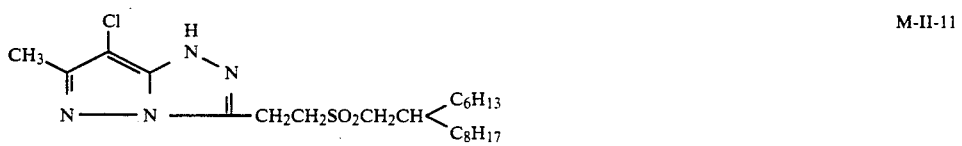
M-II-11
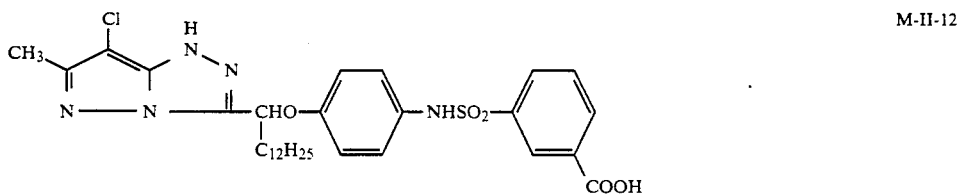
M-II-12
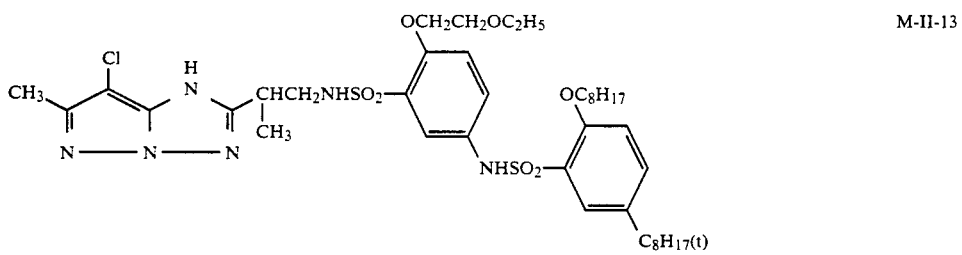
M-II-13
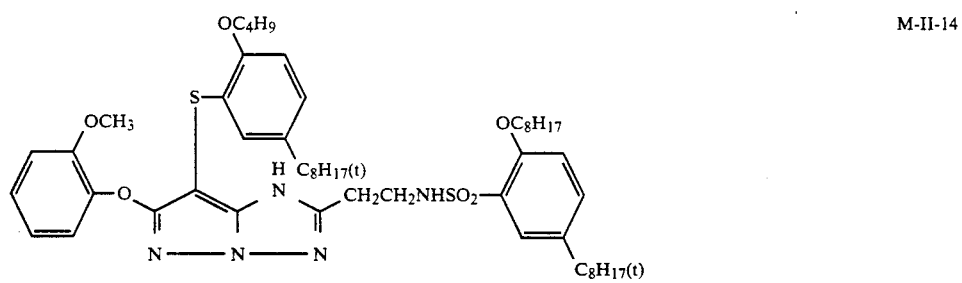
M-II-14
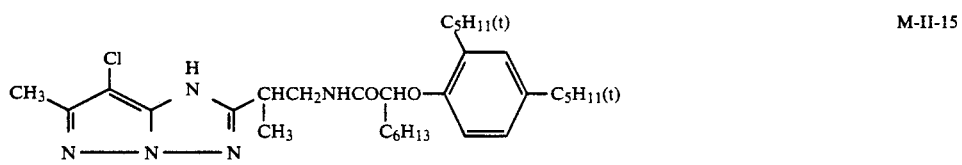
M-II-15
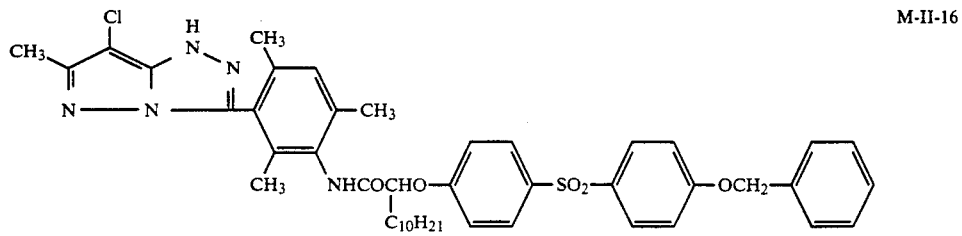
M-II-16

-continued

M-II-17

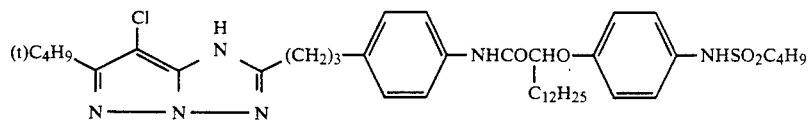

In addition to these compounds, examples of magenta couplers include the compounds described in U.S. Pat. No. 3,684,514, British Patent No. 1,183,515, Japanese Patent Examined Publication Nos. 6031/1965, 6035/1965, 15754/1969, 40757/1970 and 19032/1971, Japanese Patent O.P.I. Publication Nos. 13041/1975, 129035/1978, 37646/1976 and 62454/1980, U.S. Pat. No. 3,725,067, British Patent Nos. 1,252,418 and 1,334,515, Japanese Patent O.P.I. Publication Nos. 171956/1984, 162548/1984, 43659/1980 and 33552/1980, Research Disclosure No. 24626 (1984), Japanese Patent O.P.I. Publication Nos. 120147/1986, 120148/1986, 120149/1986, 120152/1986, 230146/1986 and 230147/1986. These compounds can be synthesized in accordance with the methods described therein.

The magenta coupler used for the present invention may be a polymer coupler as disclosed in Japanese Patent O.P.I. Publication No. 85549/1980, and may have a soluble group, as disclosed in U.S. Pat. No. 2,186,849.

The magenta coupler may also be of the so-called active site substituted type, wherein one of the hydrogen atoms at the active site is substituted by another releasable group such as a halogen atom, alkoxy, aryloxy, heterocyclic oxy, sulfonyloxy, acyloxy, acyl, heterocyclic, thiocyano, alkylthio, arylthio, heterocyclic thio, sulfonamido or phosphonyloxy group.

Moreover, the coupler may be a coupler wherein active sites of two or more kinds of couplers are bound via nonmetal atoms as disclosed in U.S. Pat. No. 3,888,680 and Japanese Patent O.P.I. Publication No. 52532/1979.

In the present invention, the addition amount of magenta coupler is normally 0.01 to 0.3 mol per mol silver halide, and the addition amount of the colored coupler of the present invention is preferably 1/20 to 1/2 mol per mol magenta coupler, though these figures are not limitative, and it may be increased or decreased as appropriate according to the properties of the silver halide, magenta coupler and colored magenta coupler of the present invention.

The colored coupler according to the present invention can be used in combination with a so-called DIR coupler as described in U.S. Pat. Nos. 3,227,551 and 3,632,345, a color correction coupler as described in Japanese Patent O.P.I. Publication No. 122335/1974, a non-color-forming coupler as described in Belgian Patent No. 746,394.

The addition site of the colored coupler of the present invention may be any hydrophilic colloidal layer constituting the silver halide color photographic light-sensitive material, but it is normally a layer containing a magenta coupler or green-sensitive silver halide. The addition site may be a layer adjoining the layer containing a magenta coupler or green-sensitive silver halide, and may be a non-green-sensitive silver halide emulsion layer or a layer, adjacent thereto, and may be an antihalation layer.

Any method can be used to add the colored coupler and magenta coupler to the silver halide color photographic light-sensitive material; any method known to applicable to ordinary silver halide photographic light-sensitive materials can be utilized. Specifically, among available methods are the method in which the coupler is dissolved in a high boiling solvent and dispersed as fine oil drops as disclosed in U.S. Pat. No. 2,322,027, the method in which the coupler is provided with a non-diffusible group and water-soluble group and then dissolved and dispersed as disclosed in U.S. Pat. No. 2,186,849, the method in which the coupler is incorporated as a component of a polymer compound as disclosed in U.S. Pat. No. 2,397,864, the method in which the coupler is filled in a latex polymer as disclosed in Japanese Patent O. P. I. Publication Nos. 59942/1976 and 59943/1976, and the method in which the coupler is mechanically milled and dispersed using a colloid mill or other means.

In a preferred mode of embodiment of the present invention, the green-sensitive silver halide emulsion layer containing the colored coupler of the present invention and a colorless magenta coupler, along with a blue-sensitive silver halide emulsion layer containing a yellow coupler such as a benzoyl acetanilide compound or pivaloyl acetanilide compound and a red-sensitive silver halide emulsion layer containing a blue-green coupler such as a naphthol compound or 2-ureido-5-acylaminophenol compound, are coated on a support to constitute the color photographic light-sensitive material. It is also possible to provide a filter layer, protective layer, interlayer, subbing layer, backing layer and other layers as necessary. Furthermore, the silver halide emulsion layers having light sensitivity in respective wavelength regions may each comprise two or more layers with different sensitivities and agradations.

The silver halide emulsion used for the present invention may be a mixed silver halide such as silver chlorobromide, silver iodobromide, silver chloroiodide or silver chloroiodobromide, as well as silver chloride, silver bromide and silver iodide. These silver halide emulsions are produced by ordinary methods; applicable methods include the ammonia method, the neutral method, the acid method, the halogen conversion method, the functional addition method and the uniform precipitation method. Although it does not matter what the average grain diameter is, the diameter range of 0.01 μm to 5 μm is preferred. It is also possible to use a mixture of two or more kinds of silver halide emulsions prepared separately.

The silver halide emulsion for the present invention can be chemically sensitized by an ordinary method. Usable chemical sensitization methods include gold sensitization using a gold complex salt, reduction sensitization using a reducing substance, sulfur sensitization using a sulfur-containing compound capable of reacting with silver ion or using a so-called active gelatin, and sensitization using a salt of a noble metal of the group VIII in the periodic table of elements.

The silver halide emulsion for the present invention can be spectrally sensitized. This is accomplished by using singly or in combination cyanine dyes such as monomethinecyanine, pentamethinecyanine, merocyanine and carbocyanine, or using them in combination with a styryl dye or aminostilbene compound.

The silver halide emulsion usable for the present invention may contain known additives such as a stabilizer, antifogging agent, surfactant, defoaming agent, antistatic agent, hardener, agent for improving physical properties of the layer, whitening agent, antistaining agent, UV absorbent and anti-irradiation agent. With respect to these additives, those described in Research Disclosure, vol. 173, No. 17643 (1978) can all be used.

The support for the silver halide color photographic light-sensitive material of the present invention can be selected as appropriate according to the purpose. Examples of usable supports include a cellulose acetate film, polyethylene terephthalate film, polystyrene film, polycarbonate film, multi-layer film comprising the above-mentioned films, paper, baryta paper, paper coated with α-olefin polymer, synthetic paper, glass and metal.

It is advantageous to use gelatin as the binder or protective colloid for the silver halide color photographic light-sensitive material described above, but other hydrophilic colloids can be used, such as gelatin derivatives, graft polymers of gelatin and another polymer, cellulose derivatives such as hydroxyethyl cellulose, carboxymethyl cellulose, cellulose sulfate, various synthetic hydrophilic polymer substances in homopolymer or copolymer such as polyvinyl alcohol, polyvinyl alcohol partial acetal, poly-N-vinylpyrrolidone, polyacrylic acid, polymethacrylic acid and polyacrylamide. These substances can be used singly or in combination with each other or in mixture with gelatin.

The color photographic light-sensitive material of the present invention offers a color image when subjected to exposure followed by an ordinary color developing process. The basic procedures of the negative-positive process are color development, bleaching and fixation, while the basic procedures of the reversal process are development with a first developer followed by either white light exposure or bath processing with a fogging agent, and color development, bleaching and fixation. These basic procedures may be carried out separately, and two or more of them may be carried out in a single procedure using a processing solution provided with the corresponding functions. Available methods include the single-bath color processing method using a bath containing a color developing agent, a ferric salt as the bleaching component and a thiosulfate as the fixation component, such as described in Japanese Patent Examined Publication No. 1885/1960, and the single-bath bleach-fixation method using a bath containing an iron (III) ethylenediaminetetraacetate complex salt as the bleaching component and a thiosulfate as the fixation component.

There is no limitation on the choice of the photographic processing method; any processing method is applicable. Representative examples thereof are as follows:

(1) The method in which bleach-fixation is performed after color development and if necessary washing and stabilization are added.
(2) The method in which bleaching and fixation are separately performed after color development and if necessary washing and stabilization are added.
(3) The method in which pre-hardening, neutralization, color development, stop fixation, washing, bleaching, fixation, washing, after-hardening and washing are performed.
(4) The method in which color development, washing, supplementary color development, stop, bleaching, fixation, washing and stabilization are performed.
(5) The method in which an amplifying agent such as peroxide or cobalt complex salt is used to process a low silver content silver halide photographic light sensitive material.

For these processing methods, the processing temperature may be above 30° C., may be room temperature or may be below 20° C. The process is normally performed at 20° to 70° C., and the temperature settings may be the same or different among a series of respective processing procedures.

In accordance with the present invention, the colored coupler represented by the Formula I offers excellent color reproduction because it has high developing activity and thus shows an excellent masking effect even in a high speed silver halide emulsion or coupler with high color formation efficiency, it causes almost no fogging and because it forms a magenta dye having an absorbtion at a long wavelength region by reaction with a color developing agent.

EXAMPLES

Example 1

3 g of each of the example colored couplers of the present invention listed in Table 1 and the comparative colored couplers A, B, C, D and E shown below was added to a mixed solvent of 4.5 ml of tricresyl phosphate and 17 ml of ethyl acetate and completely dissolved therein. This solution was mixed with 10 ml of a 6% aqueous solution of Alkanol XC (surfactant, product of Du Pont) and 200 ml of a 6% aqueous solution of low calcium content ossein gelatin, and treated in an ultrasonic homogenizer to yield an emulsified dispersion. To each of the resulting dispersions 1 kg of a high speed green-sensitive silver iodobromide emulsion was added, and a small amount of a bisvinylsulfonylethane hardener was added, whereafter the mixture was coated and dried on an cellulose acetate film support having a gelatin subbing layer.

Comparative Coupler A

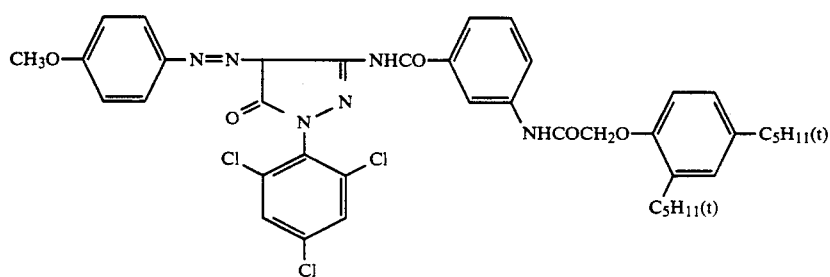

-continued

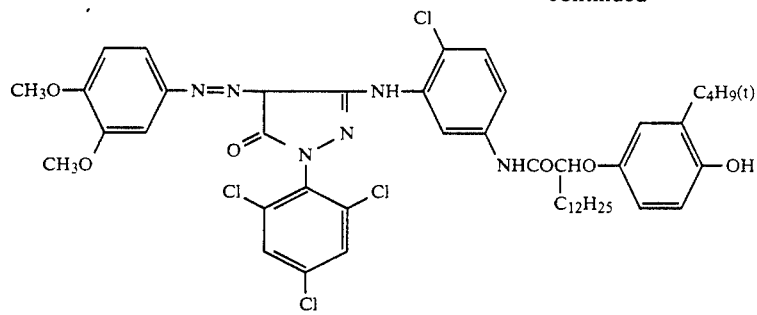

Comparative Coupler B

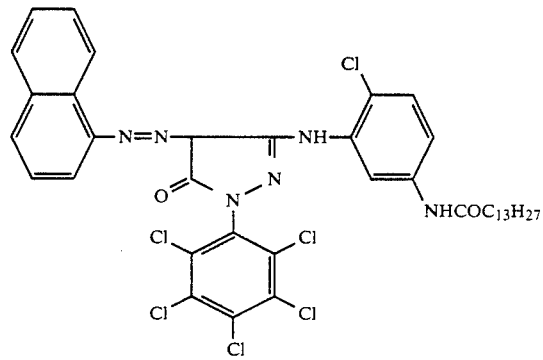

Comparative Coupler C

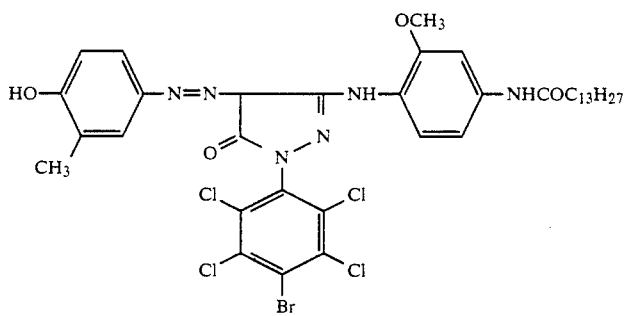

Comparative Coupler D

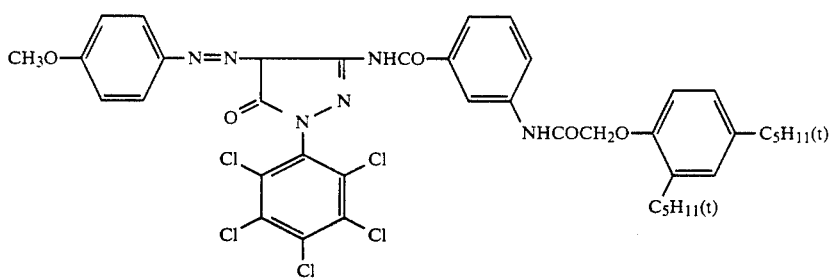

Comparative Coupler E

In accordance with a conventional method, these samples were subjected to stepwise exposure using a sensitometer and then developed using the following procedures.

| Processing procedures (38° C.) | Processing time |
| --- | --- |
| Color development | 3 minutes 15 seconds |
| Bleaching | 6 minutes 30 seconds |
| Washing | 3 minutes 15 seconds |
| Fixation | 6 minutes 30 seconds |
| Washing | 3 minutes 15 seconds |
| Stabilization | 1 minute 30 seconds |

The processing solutions used in the respective processing procedures had the following compositions:

| Color developer | |
| --- | --- |
| 4-amino-3-methyl-N-ethyl-N-(β-hydroxyethyl) aniline sulfate | 4.75 g |
| Anhydrous sodium sulfite | 4.25 g |
| Hydroxylamine ½ sulfate | 2.0 g |
| Anhydrous potassium carbonate | 37.5 g |
| Sodium bromide | 1.3 g |
| Trisodium nitrilotriacetate monohydrate | 2.5 g |
| Potassium hydroxide | 1.0 g |

Water was added to make a total quantity of 1 l, and potassium hydroxide was added to obtain a pH of 10.0.

| Bleaching solution | |
|---|---|
| Iron (III) ammonium ethylenediaminetetraacetate | 100.0 g |
| Diammonium ethylenediaminetetraacetate | 10.0 g |
| Ammonium bromide | 150.0 g |
| Glacial acetic acid | 10.0 ml |

Water was added to make a total quantity of 1 l, and aqueous ammonia was added to obtain a pH of 6.0.

| Fixer | |
|---|---|
| Ammonium thiosulfate (50% aqueous solution) | 162 ml |
| Anhydrous sodium sulfite | 12.4 g |
| Water was added to make a total quantity of 1l, and acetic acid was added to obtain a pH of 6.5 | |
| Stabilizer | |
| Formalin (37% aqueous solution) | 5.0 ml |
| Konidax (produced by Konica Corporation) | 7.5 ml |

Water was added to make a total quantity of 1.

Drying was performed to give sample Nos. 1 through 10, each having a magenta negative image and a yellow positive mask image. The magenta fogging density (Fog) in the unexposed portion and the relative sensitivity (S) and maximum absorption wavelength ($\lambda$max) of the magenta colored image for each sample are shown in Table 1 below.

TABLE 1

| Sample number | Colored coupler | Fog | S | $\lambda_{max}$ |
|---|---|---|---|---|
| 1 | CM-1 (inventive) | 0.09 | 127 | 554 |
| 2 | CM-4 (inventive) | 0.09 | 125 | 552 |
| 3 | CM-7 (inventive) | 0.08 | 134 | 555 |
| 4 | CM-13 (inventive) | 0.08 | 132 | 554 |
| 5 | CM-20 (inventive) | 0.10 | 121 | 555 |
| 6 | A (comparative) | 0.08 | 100 | 554 |
| 7 | B (comparative) | 0.10 | 130 | 543 |
| 8 | C (comparative) | 0.09 | 113 | 555 |
| 9 | D (comparative) | 0.18 | 128 | 552 |
| 10 | E (comparative) | 0.09 | 101 | 557 |

As seen in Table 1, the comparative colored magenta couplers A and E, both of which have an acylamino group at the 3-position are of very low sensitivity. Also, the comparative coupler B, which has a 2,4,6-trichlorophenyl group at the 1-position and an anilino group at the 3-position, causes undesirable discrepancy in absorption wavelength from the dye formed by the image forming magenta coupler because it produces a magenta dye whose maximum absorption wavelength is in the short wave band, though it offers high sensitivity. As for the comparative couplers C and D, both of which have a pentahalogenophenyl group at the 1-position and an anilino group at the 3-position, they offer a favorable maximum absorption wavelength but C, which has a naphthylazo group at the 4-position, is of low sensitivity, and D, which has a substituent bromine atom in the phenyl group at the 1-position is of high fogging of unknown cause.

On the other hand, the colored magenta coupler of the present invention, which has a pentachlorophenyl group at the 1-position, an anilino group at the 3-position and a phenylazo group at the 4-position, offers excellent performance, i.e., it forms a magenta dye with high sensitivity and appropriate maximum absorption wavelength without being accompanied by increase in fogging.

Example 2

In this example, the amount of addition to the silver halide photographic light-sensitive material is expressed in gram per m², unless otherwise specified. Also, the amount of silver halide and colloidal silver is expressed on the basis of the amount of silver. The amount of sensitizing dye is expressed in mol per mol silver.

Layers having the following compositions were formed on a triacetyl cellulose film support in this order from the support side to yield a multiple-layered color photographic light-sensitive material sample No. 11.

| Layer 1: Anti-halation layer HC | |
|---|---|
| Black colloidal silver | 0.15 |
| UV absorbent UV-1/ 0.20 | |
| Colored cyan coupler CC-1 | 0.02 |
| High boiling solvent Oil-1 | 0.20 |
| High boiling solvent Oil-2 | 0.20 |
| Gelatin | 1.6 |
| Layer 2: Interlayer IL-1 | |
| Gelatin | 1.3 |
| Layer 3: Low speed red-sensitive emulsion layer RL | |
| Silver iodobromide emulsion Em-1 | 0.4 |
| Silver iodobromide emulsion Em-2 | 0.3 |
| Sensitizing dye S-1 | $3.2 \times 10^{-4}$ |
| Sensitizing dye S-2 | $3.2 \times 10^{-4}$ |
| Sensitizing dye S-3 | $0.2 \times 10^{-4}$ |
| Cyan coupler C-1 | 0.50 |
| Cyan coupler C-2 | 0.13 |
| Colored cyan coupler CC-1 | 0.07 |
| DIR compound D-1 | 0.006 |
| DIR compound D-2 | 0.01 |
| High boiling solvent Oil-1 | 0.55 |
| Additive SC-1 | 0.003 |
| Gelatin | 1.0 |
| Layer 4: High speed red-sensitive emulsion layer RH | |
| Silver iodobromide emulsion Em-3 | 0.9 |
| Sensitizing dye S-1 | $1.7 \times 10^{-4}$ |
| Sensitizing dye S-2 | $1.6 \times 10^{-4}$ |
| Sensitizing dye S-3 | $0.1 \times 10^{-4}$ |
| Cyan coupler C-2 | 0.23 |
| Colored cyan coupler CC-1 | 0.03 |
| DIR compound D-2 | 0.02 |
| High boiling solvent Oil-1 | 0.25 |
| Additive SC-1 | 0.003 |
| Gelatin | 0.1 |
| Layer 5: Interlayer IL-2 | |
| Gelatin | 0.8 |
| Layer 6: | |
| Low speed green-sensitive emulsion layer GL | |
| Silver iodobromide emulsion Em-1 | 0.6 |
| Silver iodobromide emulsion Em-2 | 0.2 |
| Sensitizing dye S-4 | $6.7 \times 10^{-4}$ |
| Sensitizing dye S-5 | $0.8 \times 10^{-4}$ |
| Magenta coupler M-I-9 | 0.17 |
| Magenta coupler M-I-15 | 0.43 |
| Colored magenta coupler CM-9 | 0.10 |
| DIR compound D-3 | 0.02 |
| High boiling solvent Oil-2 | 0.070 |
| Additive SC-1 | 0.003 |
| Gelatin | 1.0 |
| Layer 7: | |
| High speed green-sensitive emulsion layer GH | |
| Silver iodobromide emulsion Em-3 | 0.9 |
| Sensitizing dye S-6 | $1.1 \times 10^{-4}$ |
| Sensitizing dye S-7 | $2.0 \times 10^{-4}$ |
| Sensitizing dye S-8 | $0.3 \times 10^{-4}$ |
| Magenta coupler M-I-9 | 0.03 |
| Magenta coupler M-I-15 | 0.13 |
| Colored magenta coupler CM-9 | 0.04 |
| DIR compound D-3 | 0.004 |
| High boiling solvent Oil-2 | 0.35 |
| Additive SC-1 | 0.003 |
| Gelatin | 1.0 |
| Layer 8: Yellow filter layer YC | |
| Yellow colloidal silver | 0.1 |
| Additive HS-1 | 0.07 |
| Additive HS-2 | 0.07 |

| | |
|---|---|
| Additive SC-2 | 0.12 |
| High boiling solvent Oil-2 | 0.15 |
| Gelatin | 1.0 |
| Layer 9: Low speed blue-sensitive emulsion layer BL | |
| Silver iodobromide emulsion Em-1 | 0.25 |
| Silver iodobromide emulsion Em-2 | 0.25 |
| Sensitizing dye S-9 | $5.8 \times 10^{-4}$ |
| Yellow coupler Y-1 | 0.60 |
| Yellow coupler Y-2 | 0.32 |
| DIR compound D-1 | 0.003 |
| DIR compound D-2 | 0.006 |
| High boiling solvent Oil-2 | 0.18 |
| Additive SC-1 | 0.004 |
| Gelatin | 1.3 |
| Layer 10: | |
| High speed blue-sensitive emulsion layer BH | |
| Silver iodobromide emulsion Em-4 | 0.5 |
| Sensitizing dye S-10 | $3.0 \times 10^{-4}$ |
| Sensitizing dye S-11 | $1.2 \times 10^{-4}$ |
| Yellow coupler Y-1 | 0.18 |
| Yellow coupler Y-2 | 0.10 |
| High boiling solvent Oil-2 | 0.05 |
| Additive SC-1 | 0.002 |
| Gelatin | 1.0 |
| Layer 11: First protective layer PRO-1 | |
| Silver iodobromide emulsion Em-5 | 0.3 |
| UV absorbent UV-1 | 0.07 |
| UV absorbent UV-2 | 0.1 |
| Additive HS-1 | 0.2 |
| Additive HS-2 | 0.1 |
| High boiling solvent Oil-1 | 0.07 |
| High boiling solvent Oil-3 | 0.07 |
| Gelatin | 0.8 |
| Layer 12: Second protective layer PRO-2 | |
| Alkali-soluble matting agent | 0.13 |
| (average grain size 2 μm) | |
| Polymethyl methacrylate | 0.02 |
| (average grain size 3 μm) | |
| Lubricant WAX-1 | 0.04 |
| Static charge controlling agent SU-1 | 0.004 |
| Static charge controlling agent SU-2 | 0.02 |
| Gelatin | 0.5 |

In addition to these compositions, a coating aid SU-4, a dispersing agent SU-3, hardeners H-1 and H-2, a stabilizer ST-1, a preservative DI-1, antifogging agents AF-1 and AF-2 and dyes AI-1 and AI-2 were added to appropriate layers.

The emulsions used to prepare the sample described above are as follows, all of which are monodispersed emulsions having a high inside iodide content.

Em-1: Octahedral grains having an average AgI content of 7.5 mol % and an average grain size of 0.55 μm.

Em-2: Octahedral grains having an average AgI content of 2.5 mol % and an average grain size of 0.36 μm.

Em-3: Octahedral grains having an average AgI content of 8.0 mol % and an average grain size of 0.84 μm.

Em-4: Octahedral grains having an average AgI content of 8.5 mol % and an average grain size of 1.02 μm.

Em-5: Octahedral grains having an average AgI content of 2.0 mol % and an average grain size of 0.08 μm.

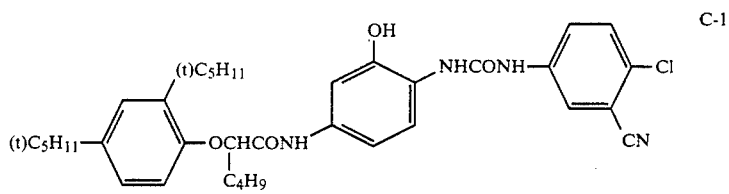

C-1

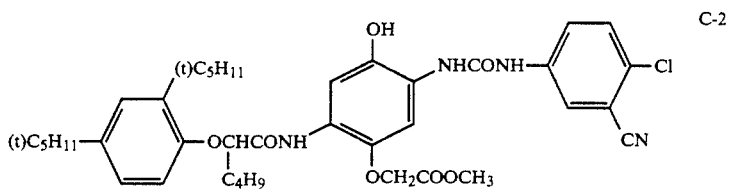

C-2

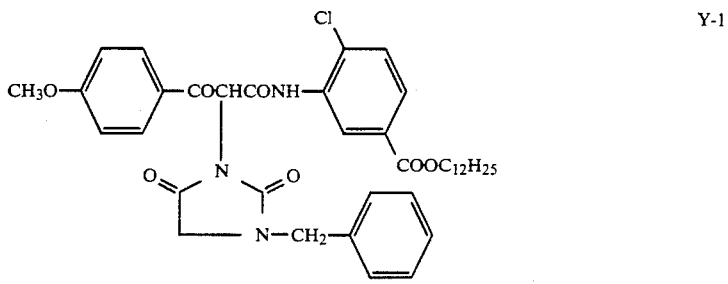

Y-1

-continued
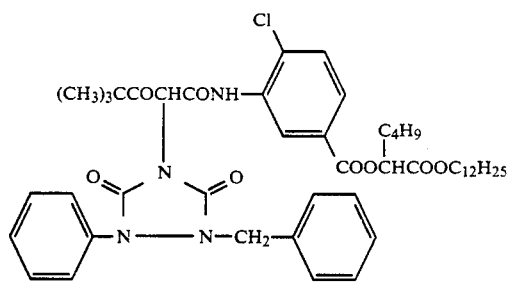
Y-2
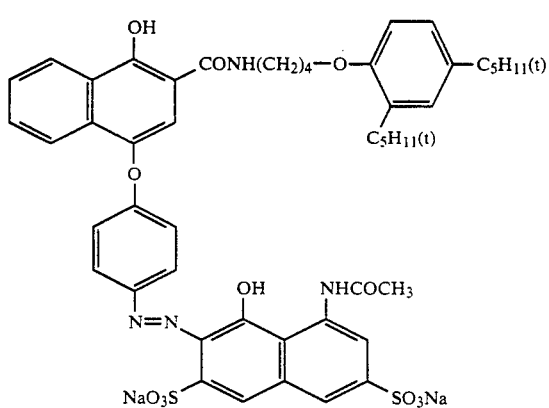
CC-1
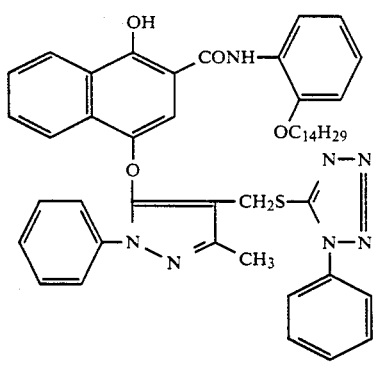
D-1
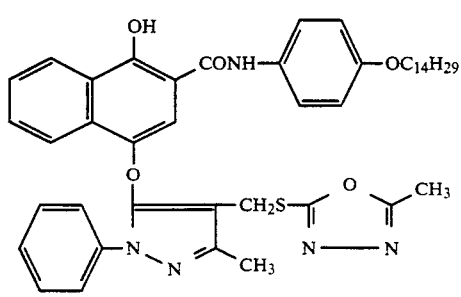
D-2

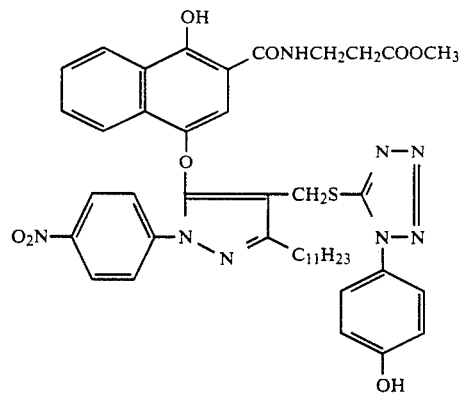
D-3
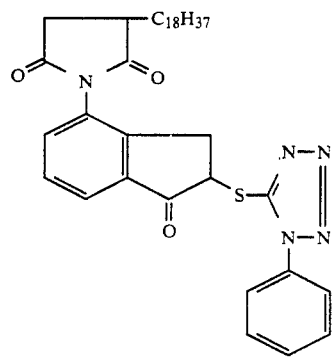
D-4
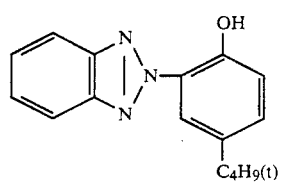
UV-1
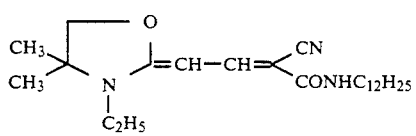
UV-2
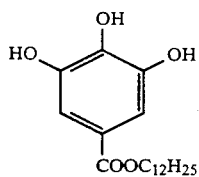
SC-1
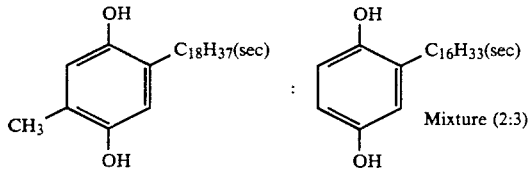
SC-2
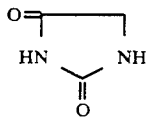
HS-1

-continued
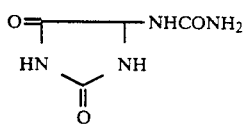 HS-2
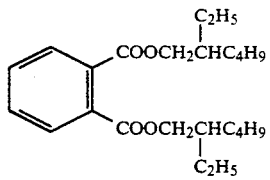 Oil-1
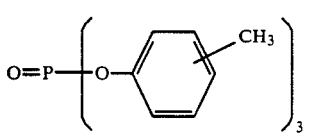 Oil-2
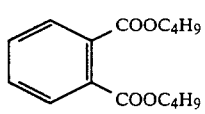 Oil-3
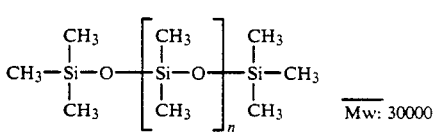 WAX-1
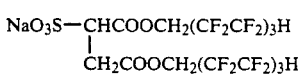 SU-1
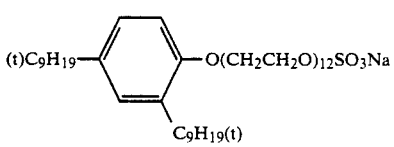 SU-2
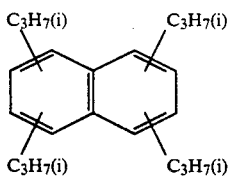 SU-3
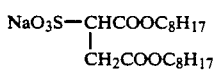 SU-4
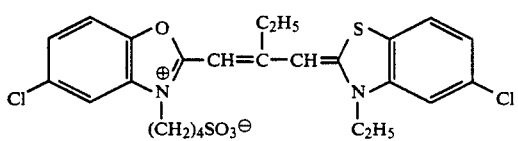 S-1
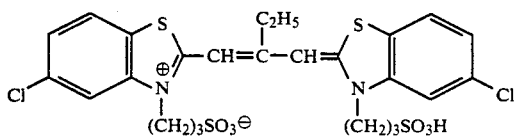 S-2

-continued
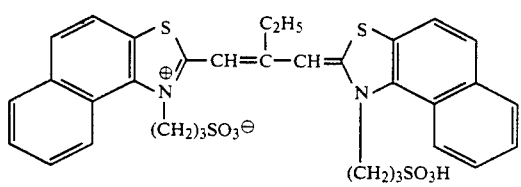
S-3
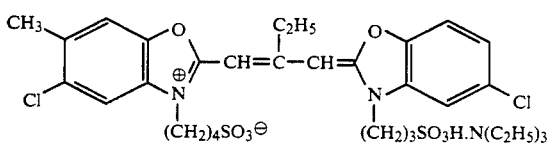
S-4
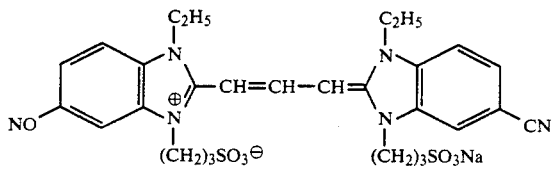
S-5
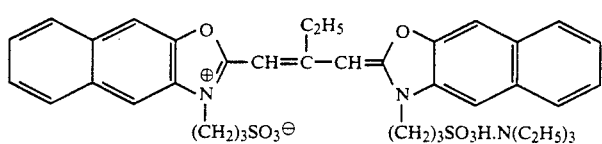
S-6
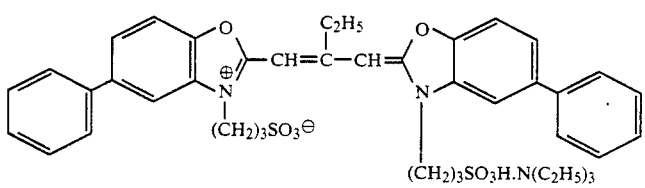
S-7
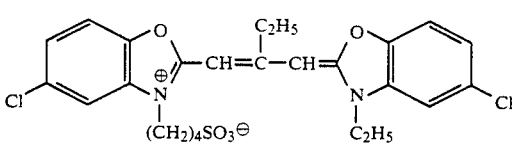
S-8
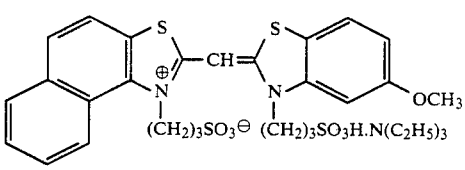
S-9
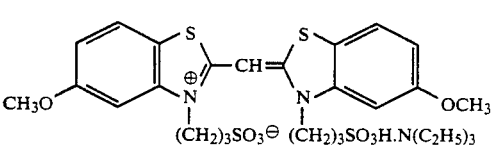
S-10
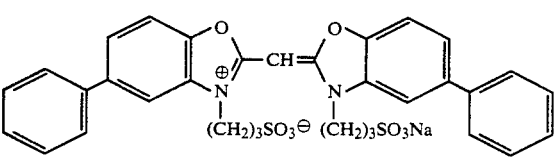
S-11
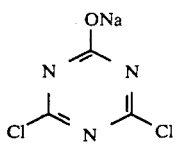
H-1

-continued

[(CH$_2$=CHSO$_2$CH$_2$)$_3$CCH$_2$SO$_2$CH$_2$CH$_2$]$_2$NCH$_2$CH$_2$SO$_3$K  H-2

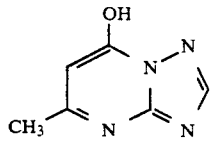 ST-1

Mixture of 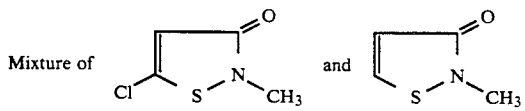 DI-1

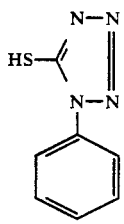 AF-1

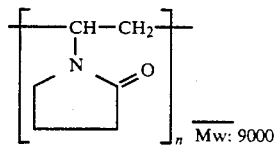 AF-2

Mw: 9000

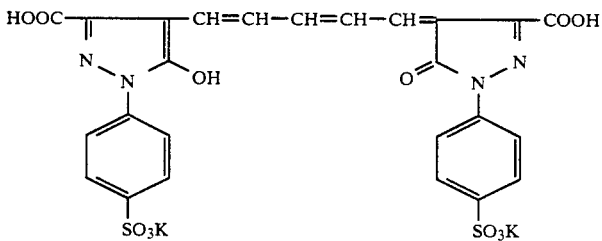 AI-1

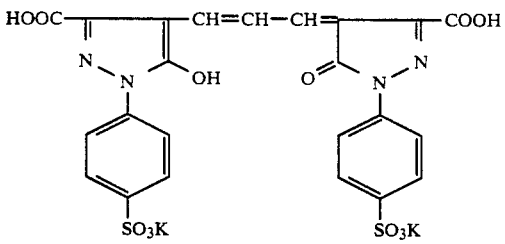 AI-2

Sample Nos. 12 to 20 were prepared in the same manner as with Sample 14 except that CM-9 in Layers 6 and 7 in Sample 11 was replaced by the color couplers listed in the following Table 2. Further Samples 21 to 24 were prepared in the same manner as with Sample 11 except that magenta couplers M-I-9 and M-I-15 was replaced by M-II-11, and colored coupler CM-29, A and B were used in Samples 22, 23 and 24, respectively, in place of CM-9. The amounts of M-II-11 in Samples 21 to 24 were decided to 60 mol % of the total amount of M-I-9 and M-I-15 in Samples 11 to 20 for adjusting the maximum densities formed in each samples to almost the same level.

The samples were processed in the same manner as in Example 1. Exposure to the samples were carried out using green light through an interference filter having a maximum transmission wavelength at 550 nm with a half eidth of 11 nm for determining the effect of the colored couples supressing undersirable absorption accompanied with magenta images.

Each of the processed samples were subjected to densitometry for measuring the magenta density D$_G$min and yellow density D$_B$min measured by blue- and green-light respectively, at an unexposed portion, and a yellow image density D$_B$ measure by blue-light at a portion exposed to an amount of light necessary for forming a magenta image density of 1.0. Then the following values of ΔD$_G$min and ΔD$_B$ were calculated. The densitometry was performed by the use of Status M Filters by Densitometer 310, manufactured by X-rite Co.

ΔD$_G$min: Difference between D$_G$min of the sample and that of Sample 18.

The smaller this value is, the less fogging is, resulting in formation of good images having less granular appearance.

$\Delta D_B$: The value defined as $\Delta D_B = D_B - D_B\text{min}$.

The smaller this value is, higher color purity of reproduced images due to the more efficiently effect of colored coupler supressing not undesired yellow density accompanied with magenta images.

Thus obtained results are listed in the following Table 2.

TABLE 2

| Sample No. | Magenta coupler | Colored coupler | $\Delta D_G$min | $\Delta D_B$ | Note |
|---|---|---|---|---|---|
| 11 | M-I-9/M-I-15 | CM-9 | +0.01 | +0.01 | Inventive |
| 12 | M-I-9/M-I-15 | CM-3 | ±0 | +0.02 | Inventive |
| 13 | M-I-9/M-I-15 | CM-5 | +0.01 | +0.02 | Inventive |
| 14 | M-I-9/M-I-15 | CM-10 | ±0 | +0.02 | Inventive |
| 15 | M-I-9/M-I-15 | CM-11 | ±0 | +0.01 | Inventive |
| 16 | M-I-9/M-I-15 | CM-28 | −0.01 | +0.01 | Inventive |
| 17 | M-I-9/M-I-15 | CM-29 | −0.01 | ±0 | Inventive |
| 18 | M-I-9/M-I-15 | A | ±0 | +0.08 | Comparative |
| 19 | M-I-9/M-I-15 | C | +0.02 | +0.06 | Comparative |
| 20 | M-I-9/M-I-15 | D | +0.06 | +0.03 | Comparative |
| 21 | M-II-11 | CM-9 | +0.01 | −0.04 | Inventive |
| 22 | M-II-11 | CM-29 | +0.01 | −0.06 | Inventive |
| 23 | M-II-11 | A | +0.03 | +0.06 | Comparative |
| 24 | M-II-11 | D | +0.12 | +0.02 | Comparative |

What is claimed is:

1. A silver halide color photographic light-sensitive material comprising a support having thereon a hydrophilic colloid layer containing a compound represented by the following Formula I,

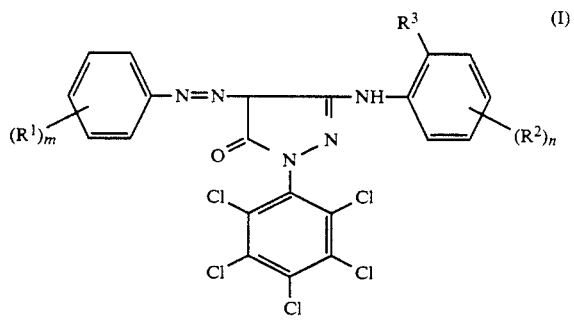

wherein $R^1$ is a monovalent substituent; $R^3$ is a halogen atom or an alkoxy group; $R^2$ is an acylamino group, a sulfonamido group, an imido group, a carbamoyl group, a sulfamoyl group, an alkoxycarbonyl group or an alkoxycarboxyamido group; m is an integer of 0 to 5 and n is an integer of 0 to 4.

2. The material of claim 1, wherein said substituent represented by $R^1$ is an alkyl group, an alkoxy group, an aryl group, an acylamino group, a sulfonamido group, a hydroxyl group, a halogen atom, an alkoxycarbonyl group, an acyl group, a carbamoyl group, a sulfamoyl group or a carboxyl group.

3. The material of claim 2, wherein said substituent represented by $R^1$ is an alkyl group, an alkoxy group, a hydroxyl group or an acylamino group.

4. The material of claim 3, wherein said substituent represented by $R^1$ is an alkoxy group.

5. The material of claim 1, wherein said group represented by $R^2$ is an acylamino group.

6. The material of claim 1, wherein said $R^3$ is chlorine atom.

7. The material of claim 1, wherein said hydrophilic layer comprises said compound represented by Formula I, a substantially colorless magenta coupler and a green-sensitive silver halide emulsion.

8. The material of claim 7, wherein said magenta coupler is a compound represented by the following Formula M-I;

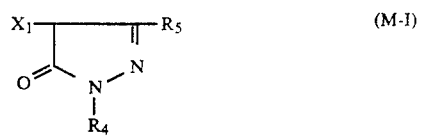

wherein $R_4$ is an aryl group; $R_5$ is an acyamino group, an arylamino group, a ureido group, a carbamoyl group or a heterocyclic group; and $X_1$ is a hydrogen atom or a substituent capable of splitting off upon coupling reaction with the oxidation product of a color developing agent.

9. The material of claim 7, wherein said magenta coupler is a compound represented by the following Formula M-II;

wherein Z is a group of atoms necessary for competing a nitrogen-containing heterocyclic ring; $X_2$ is a hydrogen atom or a substituent capable of splitting off upon coupling reaction with the oxidation product of a color developing agent; and $R_6$ is a substituent.

10. The material of claim 7, wherein said hydrophilic colloid layer contains said magenta coupler in an amount of from 0.01 mols to 0.3 mols per mole of silver halide contained in said hydrophilic layer.

11. The material of claim 7, wherein a ratio of said colored coupler to said magenta coupler in said hydrophilic colloid layer is within the range of from 1:20 to 1:2.

12. A silver halide color photographic light-sensitive material comprising a support having thereon a hydrophilic colloid layer comprising a green-sensitive silver halide emulsion, a compound represented by the following Formula I and a magenta coupler represented by the following Formula M-II;

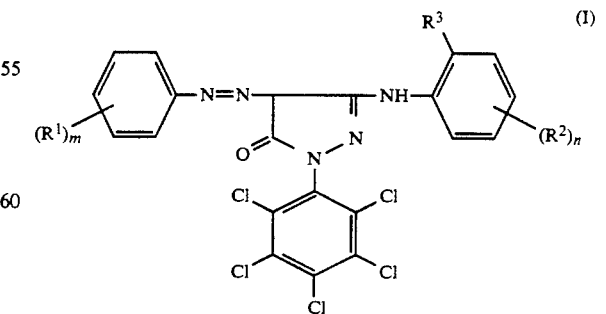

wherein $R^1$ is an alkoxy group; $R^2$ is an acyl amino group; $R^3$ is a chlorine atom; m is an integer of 1 to 2, and n is 1,

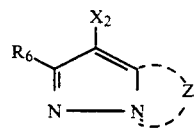

(M-II)

wherein Z is a group of atoms necessary for completing a nitrogen-containing heterocyclic ring; $X_2$ is a hydrogen atom or a substituent capable of splitting off upon coupling reaction with the oxidation product of a color developing agent; and $R_6$ is a substituent.

* * * * *

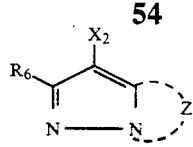

(M-II)

wherein Z is a group of atoms necessary for completing a nitrogen-containing heterocyclic ring; $X_2$ is a hydrogen atom or a substituent capable of splitting off upon coupling reaction with the oxidation product of a color developing agent; and $R_6$ is a substituent.

* * * * *